Figure 2:
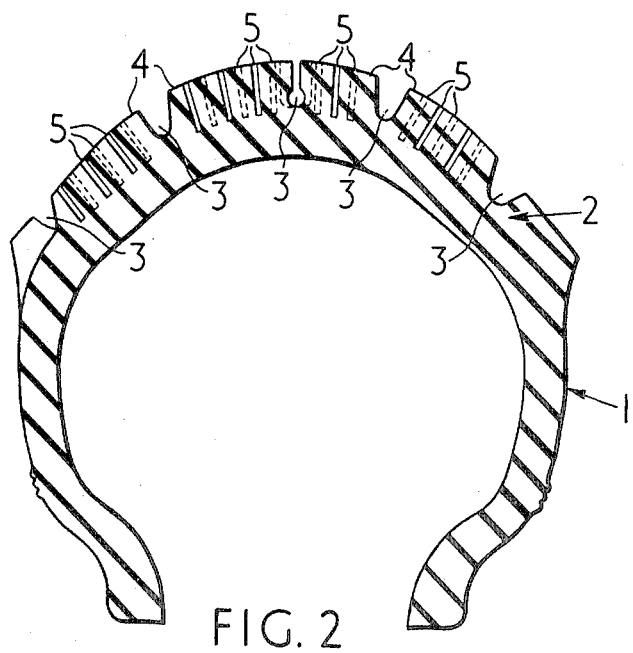

United States Patent

Roberts et al.

[15] 3,637,001

[45] Jan. 25, 1972

[54] PNEUMATIC TYRES

[72] Inventors: Glyn B. Roberts, Four Oaks, Sutton Coldfield; Thomas Holmes, Walmley, Sutton Coldfield, both of England

[73] Assignee: The Dunlop Company Limited, London, England

[22] Filed: Dec. 20, 1968

[21] Appl. No.: 785,626

[30] Foreign Application Priority Data

Dec. 28, 1967 Great Britain......................58,833/67

[52] U.S. Cl..............................................152/209
[51] Int. Cl..............................................B60c 11/10
[58] Field of Search...................................152/209

[56] References Cited

UNITED STATES PATENTS

| | | | |
|---|---|---|---|
| 2,504,090 | 4/1950 | Sanderson | 152/209 |
| 3,409,064 | 11/1968 | Leonard | 152/209 |

*Primary Examiner*—James B. Marbert
*Attorney*—Stevens, Davis, Miller & Mosher

[57] ABSTRACT

A pneumatic tire particularly adapted for use over water wet surfaces having a tread portion provided with water-absorbing chambers of relatively small cross-sectional area at the ground-contacting surface of the tread, such as cylinders of small diameter, extending radially inwardly into the tread, for absorbing water during contact of the chamber with the water wet surface, and ejection of absorbed water at a later stage in a revolution of the tire.

10 Claims, 2 Drawing Figures

PNEUMATIC TYRES

This invention relates to tires, both solid and pneumatic tires, and is a modification of U.S. Pat. No. 3,409,064.

In the specification of U.S. Pat. No. 3,409,064 there is described the difficulty experienced in the removal by pneumatic tires of water lying upon a road surface, the problem increasing according to speed.

In accordance with the invention claimed in respect of U.S. Pat. No. 3,409,064 a pneumatic tire is provided with a tread portion, the ground-contacting surface of which is provided with at least one generally circumferential rib, and generally circumferential grooves, one on each side of the ribs, the rib having a plurality of water-absorbing chambers formed therein upon the ground-contacting surface of the rib, the distance between a given reference point on a chamber and an equivalent point on a neighboring chamber being between 0.19 inch and 0.5 inch measured at said surface, and each chamber if of circular cross section at said surface having a diameter of between 0.06 inch and 0.19 inch or if of noncircular cross section at said surface having an equivalent cross-sectional area and a length not greater than three times the width thereof measured at said surface.

It has been found that, particularly at high speeds (e.g., 80 m.p.h.) and when a tire is in contact with a road surface, fine chambers of a size in terms of area measured at the ground-contacting surface which is substantially smaller than those specifically referred to in the specification of U.S. Pat. No. 3,409,064, when present in a tire tread in a concentration such that the total volume of tread rubber removed from the two types of tire under consideration is of the same order, provides a substantial improvement in wet grip. Considerable improvement in grip may also be achieved at comparatively low speed.

According to the present invention, a tire is provided comprising a tread portion, the ground-contacting surface of which is provided with water-absorbing chambers extending into the depth of the tread rubber closed at the radially inner end thereof, each chamber being of circular cross section of a diameter from 1 mm. to one-eighth mm. or having an equivalent cross-sectional area and being of other cross-sectional shape provided that the chamber has measured at the surface of the tread a length not greater than three times the width thereof, the distance between a given reference point on the chamber and an equivalent point on the closest neighboring chamber thereto being from 9 to one-fifth mm. measured at said surface the quantity of chambers provided being such as to reduce the tread wearing surface of the tire by no more than 35 percent compared with a tire not provided with chambers.

The cross-sectional shape of the chambers, as is realized in the specification of U.S. Pat. No. 3,409,064 may be crescent-shaped, lozenge-shaped, rectangular-shaped or of a nonsymmetrical shape, in all instances the length of the chamber being not greater than three times the width thereof, the length being defined as the maximum dimension of the chamber at the ground-contacting surface of the tread, and the width being defined as the maximum dimension of the chamber measured normally to the direction of said length, said dimensional limitations excluding slots of a form which is described in British Pat. No. 1,101,135.

The cross-sectional areas of each of the chambers in a portion thereof, of circular cross section or otherwise, need not necessarily have a single value and may have a plurality of substantially different values.

In the case of chambers of circular cross section, chambers of a diameter lying within the range one-half to 1 mm. at concentrations which are consistent with the tread volume loss of tires having the larger diameter chambers specifically referred to in the specification of U.S. Pat. No. 3,409,064 have been found to provide improved wet grip. Nevertheless, chambers of even smaller diameter may be utilized down to the limit of practical size which may be as low as one-eighth mm. provided that an actual chamber extending from and open to the ground-contacting surface is provided.

The chambers may be disposed in a circumferential plane of tire. Alternatively, said chambers may be normally disposed with respect to the axial cross-sectional profile of the ground-contacting surface of the tire tread. In another alternative, the chambers are substantially inclined to a circumferential plane of the tire in a transverse sense and/or to an axial plane of the tire in a circumferential sense.

The depth of the chambers may be as great as or greater than the depth of the grooves of the general pattern applied to the tread, the chambers may extend to a depth of up to 5 mm. below the deepest groove provided in the tread, provided that the tread rubber is able to accommodate such a depth of chamber without the tire casing being penetrated. It will be appreciated that with this range of dimensions a ratio of depth to maximum length or diameter of chambers measured at the ground-contacting surface may be as high as 250:1.

The superior wet grip properties of a tire provided with fine chambers in the tread portion thereof, over a tire provided with relatively larger diameter chambers in the tread portion thereof may be understood by the following hypothesis.

If a tire is considered rolling over a water wet surface, with the tread thereof contacting said surface and the tread being provided with a plurality of water-absorbing chambers, the chambers while traversing the water wet ground surface will absorb water therefrom, this water being forced into the chambers against a back pressure of air contained therein. The absorbed water will be expelled by centrifugal force and air pressure during the period wherein each chamber is not in contact with the ground.

The tire will be preceded by a wedge of water penetrating the ground patch. Trailing directly behind the water wedge is a water film region of very small thickness hereinafter referred to as the viscous film region which region is a transitional region between the wedge of water and a dry region which trails directly behind said viscous film region. It is the size of the dry region that determines the grip between the tire and the ground.

If a chamber is considered devoid of water approaching the ground contact patch during a revolution of the tire rolling over the water wet surface, as the chamber traverses the water wedge, water is urged into the chamber against the developed back pressure of the compressed air within the chamber. When the chamber enters the viscous film region it continues to absorb water, provided that its water-absorbing capacity has not been fully satisfied during its traversal of the wedge of water, this water being urged into the chamber by the contact pressure of the surrounding tread, and the amount of water absorbed in this region being dependent on the length of time to traverse this region.

It is considered that a relatively small diameter chamber when compared with relatively larger diameter chambers of the same depth will absorb relatively less water while traversing the water wedge due to surface tension effects becoming more pronounced at small diameters. Thus a relatively small diameter chamber will have a relatively higher water-absorbing capacity in the viscous film region. It should be noted that the hydrostatic pressure in the viscous film region is much greater than that of the water wedge and consequently the potential water-absorbing capacity of chambers of any size both small and large in this region may be more fully realized unless as is the case with the relatively large chambers the potential water clearance capacity of the chambers is partly or fully satisfied during traversal of the water wedge. It is in this viscous film region that water clearance is essential to prevent the phenomenon generally known as aquaplaning. This region comprises a thin film of water which completely or partly separates the contact patch that the tire would enjoy during dry conditions from the surface of the ground.

It is considered therefore that the size of the chambers is of importance in obtaining water clearance and thus tire grip.

In addition the concentration of chambers should be high as will be seen later in the specification since a most important practical consideration is the time available for movement of water from the said viscous film region at relatively high speeds, from a position between chambers into one of those chambers, high concentration giving a greater opportunity for acceptance of water by the chambers during the very small interval of time afforded as the chambers traverse said viscous film region.

The water-clearing capacity of the chambers is limited by the tendency of water accepted by a chamber to compress the air into the confined space at the closed end of the chamber, the pressure setup restricting the entry of further water completely to fill the chamber. If, however, the chamber has a cross-sectional area which increases from the entry to the opposite closed end, then the degree of compression of the trapped air is reduced, for a given volume of accepted water, compared with a chamber of equal entry cross-sectional area and of uniform cross-sectional area throughout its length. In this respect, for example, bulbous-ended chambers or frustoconical chambers may be used.

However, it may be advantageous in some cases to provide the chambers with an entry portion of greater cross-sectional area than the body portion thereof. Such cases might arise for instance when it is desired to mould chambers in a tire tread. In such cases, definite advantage would arise if the moulding pins for moulding the chambers were each provided with a webbed or otherwise enlarged base to yield a more rigid and durable moulding pin.

As regards the positional distribution of the chambers, they may be in lines parallel to circumferential directions, and may also be in staggered echelon formation, preferably arranged so that there is no point across the width of the ground-contacting portion of the tire which would not be in substantial alignment, somewhere around the circumference with a chamber. Alternatively, the distribution of the chambers is of a random or an irregular nature either linearly of the tread, the distribution being ordered in another direction or wholly irregular or random.

The chambers may be distributed over certain spaced-apart regions on the tread. In addition, the distribution of the chambers may be ordered in some regions and irregular or random in other regions.

As regards the density of concentration of the chambers, a practical limit may be set by the reduction of wearable tread surface caused by the provision of the chambers and a practical limit may be the overall removal of 35 percent of the whole wearable surface.

In many cases a reduction of tread wearable surface of the order of 2 percent is employed though greater reductions in wearable surface need not result in lower tread life over the life of a tread not provided with chambers. Furthermore, for example with aircraft tires, landing on a wet surface when the tire fails to rotate can cause heat degradation of the tread. This may be at least partly avoided in tires with chambers since the tire will continue to rotate and thus effectively the tread life is increased by reduction of heat degredation.

By way of example, if the chamber is of cylindrical form and is applied to a motor cycle tire the following figures are applicable:

a. 1 mm. diameter chamber—27,800 chambers per square meter measured at the tread surface giving a 6 mm. spacing between centers.

b. ½ mm. diameter chamber—111,200 chambers per square meter measured at the tread surface giving 3 mm. spacing between centers.

c. ¼ mm. diameter chamber—444,800 chambers per square meter measured at the tread surface giving a 1.5 mm. spacing between centers.

d. ⅛ mm. diameter chamber—1,799,200 chambers per square meter measured at the tread surface giving a 0.75 mm. spacing between centers.

In each of the examples (a), (b), (c) and (d) the product of the square of the diameter and the number of the chambers per unit area is a constant and equal to approximately 27,800 $mm.^2m.^-$.

In order to dispose of the bulk water lying on a road surface over which a tire is to run, before dealing with the disposal of the remaining water by means of the chambers, it may be desirable to have generally circumferential grooves between ribs or blocks for channeling away the bulk water.

It may be an advantage, in some tires, particularly motor car tires, to have a combination of chambers, of the kind provided according to the present invention, and slots of the kind provided in accordance with the invention described in British Pat. No. 1,101,135, the location of the chambers being preferably in a region of high-contact pressure e.g., in a tire where the high-contact pressure occurs in the crown region, the chambers will be located there while the slots are provided on each side of the crown region either alone or combined with chambers.

It will be understood that the whole of the ground-contacting surface of the tread need not be provided with chambers but only certain selected areas of that surface.

The tire in accordance with the invention may be provided with shoulder paddles as referred to in the specification of copending application Ser. No. 16196/67 or, alternatively, it may be provided with scoops in the tread as described in the specification of copending application Ser. No. 717,830.

In addition, the chambers of small diameter, according to the present invention, are more easily formed in a fabric reinforced tread tire and interfere less with the fabric reinforcement during the formation of the chambers than the comparatively large chambers of the kind described in the specification of British Pat. No. 1,132,352, the provision of chambers in reinforced tread tires being covered in British Pat. application No. 23353/67.

Figure 1:
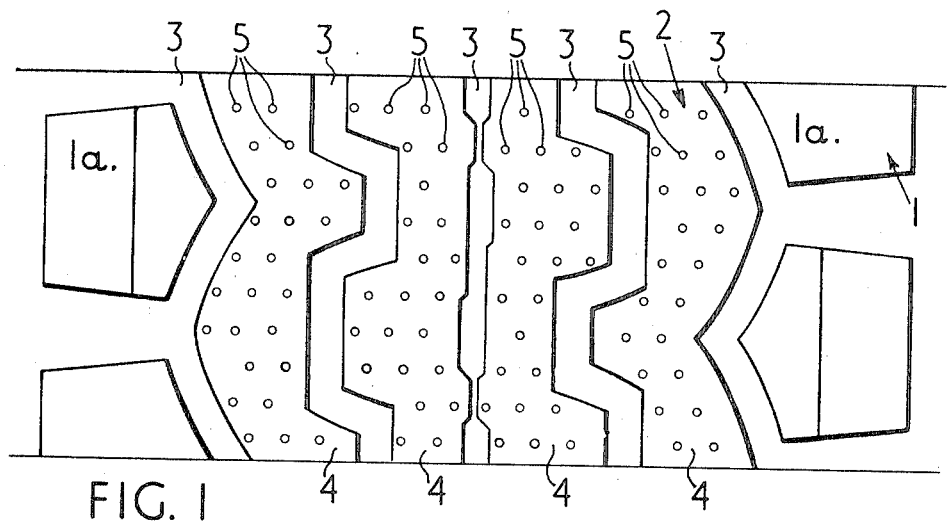

One embodiment of the invention will now be described in more detail with reference to the accompanying drawings wherein:

FIG. 1 shows a diagrammatic fragmentary plan view of a motor cycle tire tread constructed according to the embodiment of the invention, FIG. 2 shows an axial cross-sectional view of the tire illustrated in FIG. 1.

According to an embodiment of the invention, a motor cycle tire 1 of size 4.00–18 has a tread portion 2 incorporating 5 generally circumferentially extending grooves 3, shown in FIGS. 1 and 2 to drain the bulk of water from the contact patch of the tire on a wet road. The grooves 3 define four ribs 4 and shoulder blocks 1a in the tire tread 2, the ribs being provided with a plurality of chambers 5 which are cylindrical. The said chambers 5 have a diameter of approximately 1 mm. and a depth of approximately 6 mm., the chambers 5 extending below the depth of the grooves 3 by 2 mm. The center-to-center spacing between the chambers 5 is approximately 6 mm. the number of chambers per square meter being 27,800. The arrangement described results in approximately 2 percent removal of the total possible rubber available for wear.

In high-speed operation of this tire on a wet testing drum, a substantially increased grip is obtained compared with the grip obtained with a patterned tire with or without slots and without chambers, the increased grip being most noticeable when a comparatively low-slip condition exists between the tire and drum. This is of considerable value in the avoidance of the development of a skid, and can be a valuable application in respect of the satisfactory operation of antiskid brake-controlling units utilized in conjunction with tire according to the present invention.

While the invention has been specifically described in respect of a motor cycle tire it is applicable to other types of tires, for example, brakable aircraft tires, motor car tires, truck tires and solid tires.

Having now described our invention, what we claim is:

1. A tire comprising a tread portion, the ground-contacting surface of which is provided with water-absorbing chambers extending into the depth of the tread rubber, closed at the radially inner ends thereof, each chamber being of circular cross section of a diameter from 1 to one-eighth mm. or having an equivalent cross-sectional area and being of other cross-sectional shape provided that the chamber has measured at the surface of the tread a length not greater than three times the width thereof, the distance between a given reference point on the chamber and an equivalent point on the closest neighboring chamber thereto being from 9 to one-fifth mm. measured at said surface the quantity of chambers provided being such as to reduce the tread wearing surface of the tire by no more than 35 percent compared with a tire not provided with chambers.

2. A tire according to claim 1 wherein the tread is provided with at least one generally circumferentially extending groove and the depth of each chamber is at least as deep as the deepest groove.

3. A tire according to claim 2 wherein each chamber extends to a depth of up to 5 mm. below the deepest groove.

4. A tire according to claim 1 wherein the ratio of the depth of the chambers to the maximum length is less than 250:1 measured at the ground-contacting surface.

5. A tire according to claim 1 wherein the chambers are arranged circumferentially in lines, each line of chambers being staggered with respect to the next in the form of an echelon arrangement.

6. A tire according to claim 5 wherein the chambers are arranged so that there is no point across the width of the ground-contacting portion of the tire which would not be in substantial alignment somewhere around the circumference with a chamber.

7. A tire according to claim 1 wherein the cross-sectional areas of all the chambers is substantially equal.

8. A tire according to claim 1 wherein the cross-sectional areas of each of the chambers in a portion thereof has a certain value the remainder of the chambers each having a cross-sectional area of a different value.

9. A tire according to claim 7 wherein the chambers each are of circular shape and have a diameter of between one-half and 1 mm.

10. A tire according to claim 7 wherein the product of the square of the diameter of each chamber and the number of chambers per unit area is approximately 27,800 square millimeters per square meter.

* * * * *

UNITED STATES PATENT OFFICE
CERTIFICATE OF CORRECTION

Patent No. 3,637,001              Dated January 25, 1972

Inventor(s) Glyn B. ROBERTS et al

It is certified that error appears in the above-identified patent and that said Letters Patent are hereby corrected as shown below:

Column 4, line 21, "Ser. No. 16196/67" should read --- Ser. No. 718897 ---.

Signed and sealed this 15th day of August 1972.

(SEAL)
Attest:

EDWARD M. FLETCHER, JR.              ROBERT GOTTSCHALK
Attesting Officer                    Commissioner of Patents